July 25, 1967 H. A. BARNBY 3,332,788
STERILE FOOD PACKAGING OPERATION
Filed Nov. 12, 1965 10 Sheets-Sheet 1

INVENTOR.
HERBERT A. BARNBY, DECEASED
BY BERNICE P. BARNBY, EXECUTRIX
BY W. A. Schaich
and J. R. Nelson
ATTORNEYS

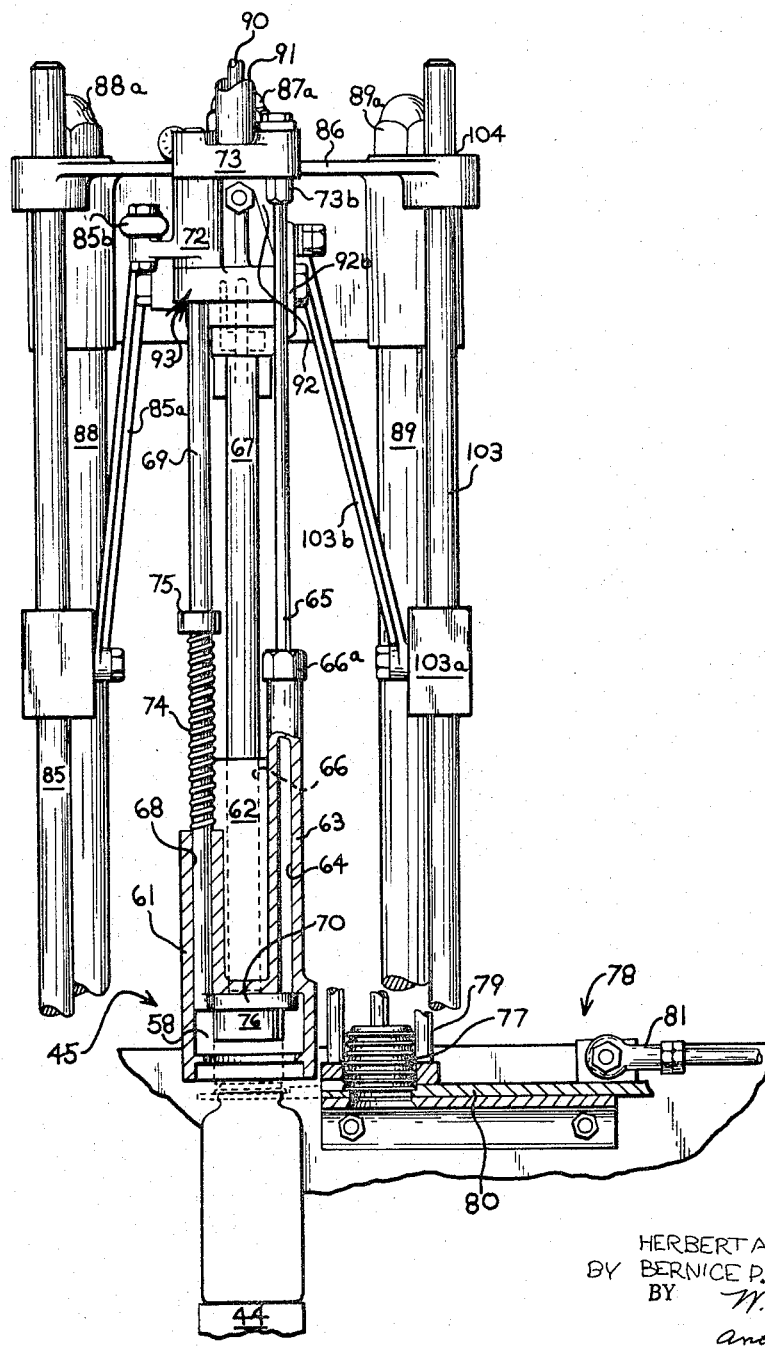

July 25, 1967  H. A. BARNBY  3,332,788
STERILE FOOD PACKAGING OPERATION
Filed Nov. 12, 1965  10 Sheets-Sheet 4

INVENTOR.
HERBERT A. BARNBY, DECEASED
BY BERNICE P. BARNBY, EXECUTRIX
BY W. A. Schaich
and J. R. Nelson
ATTORNEYS

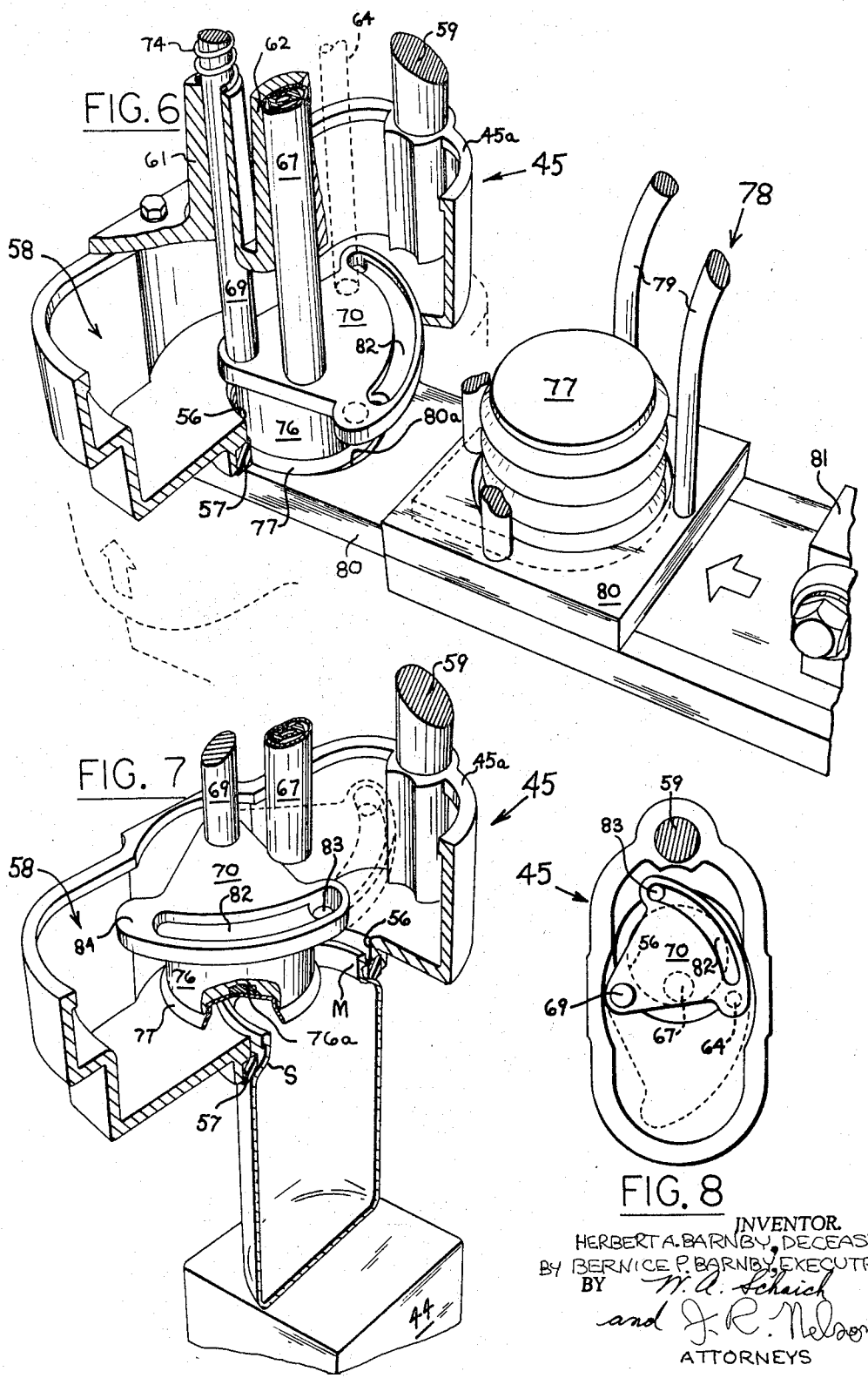

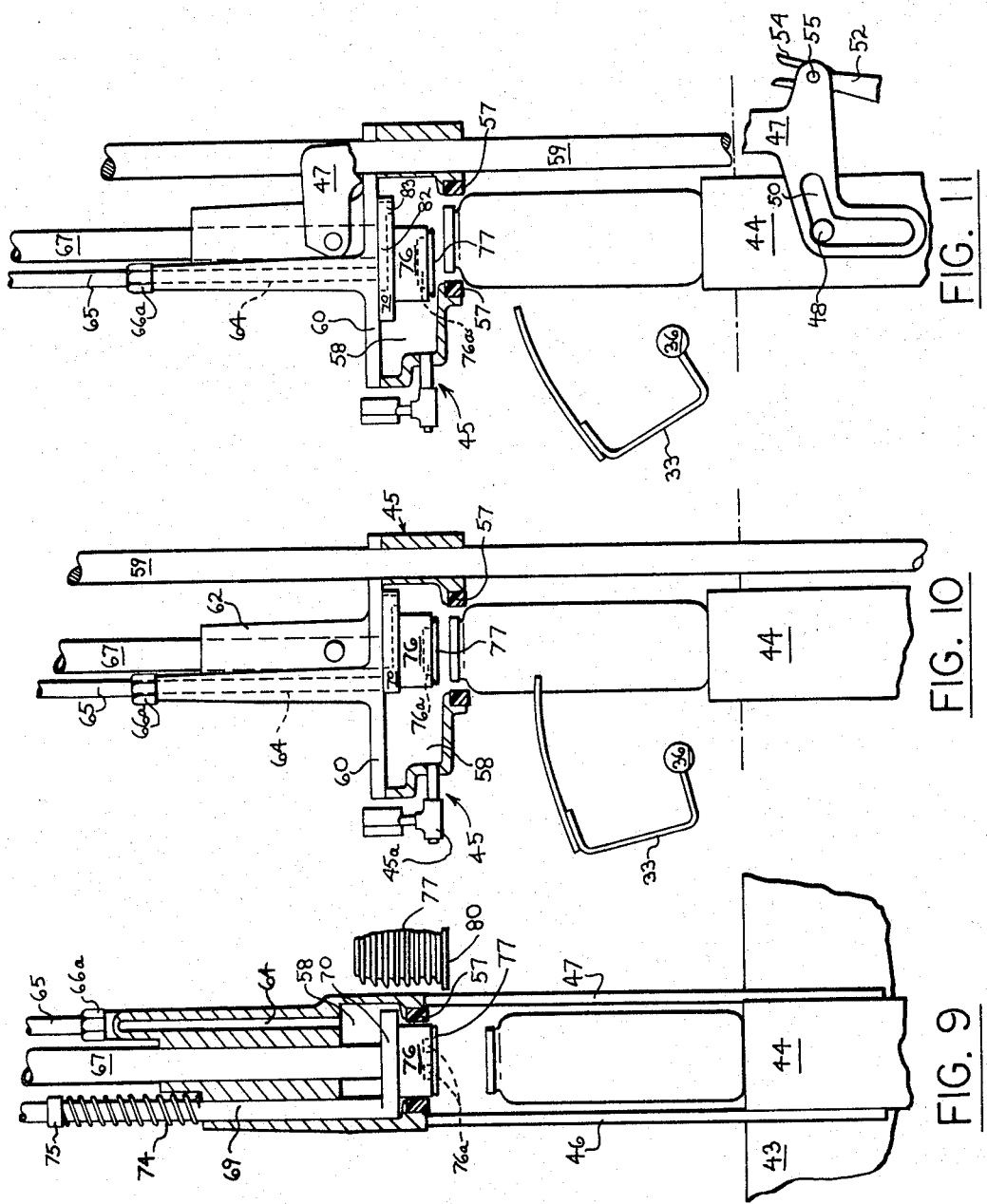

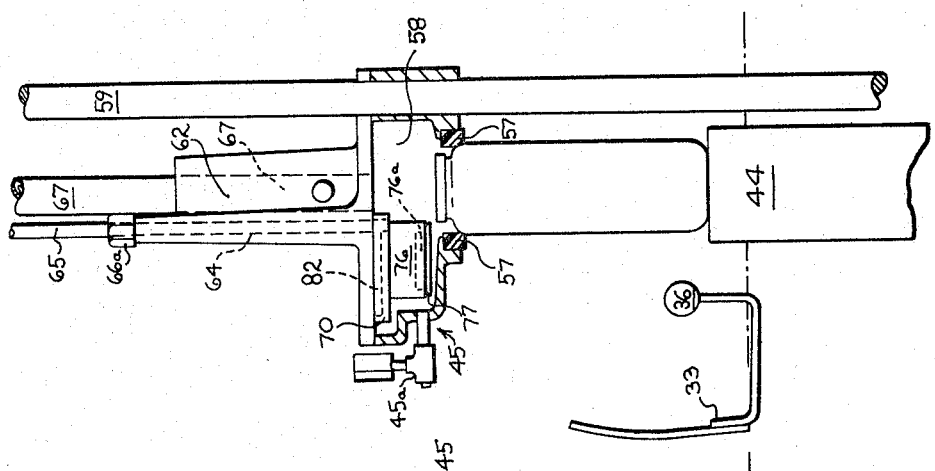
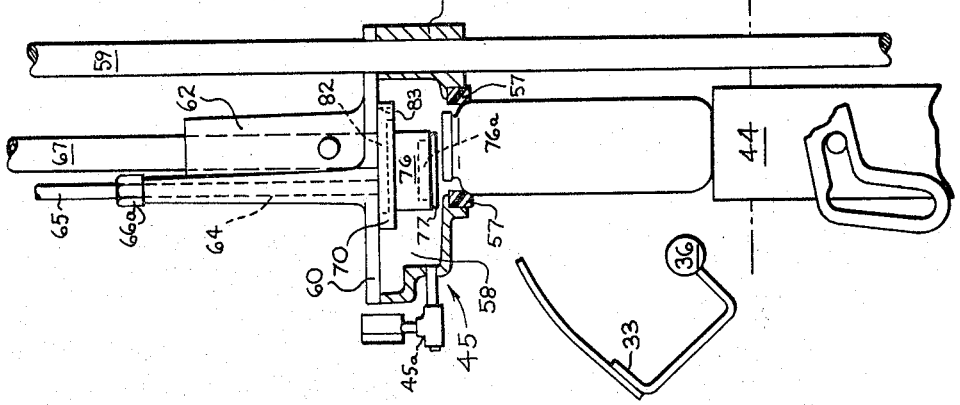
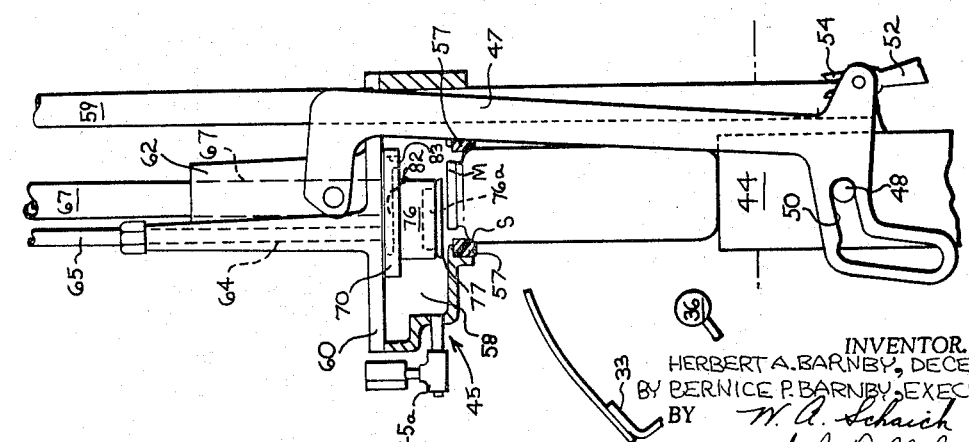

INVENTOR.
HERBERT A. BARNBY, DECEASED
BY BERNICE P. BARNBY, EXECUTRIX
ATTORNEYS

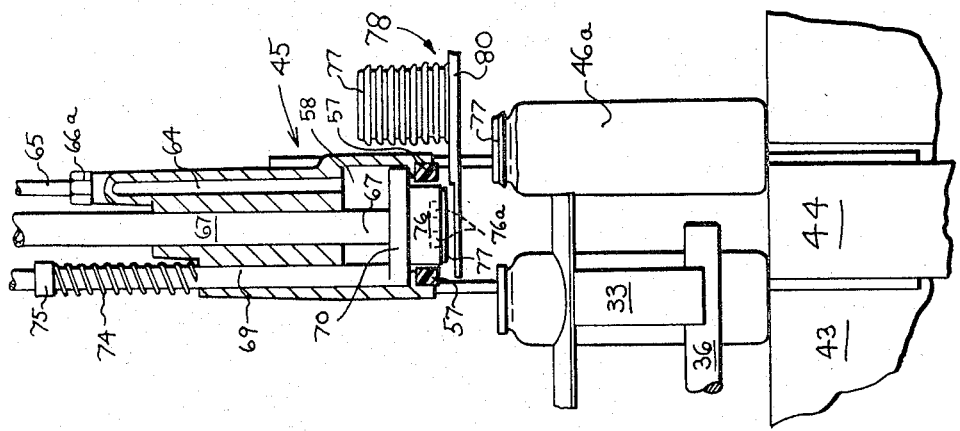
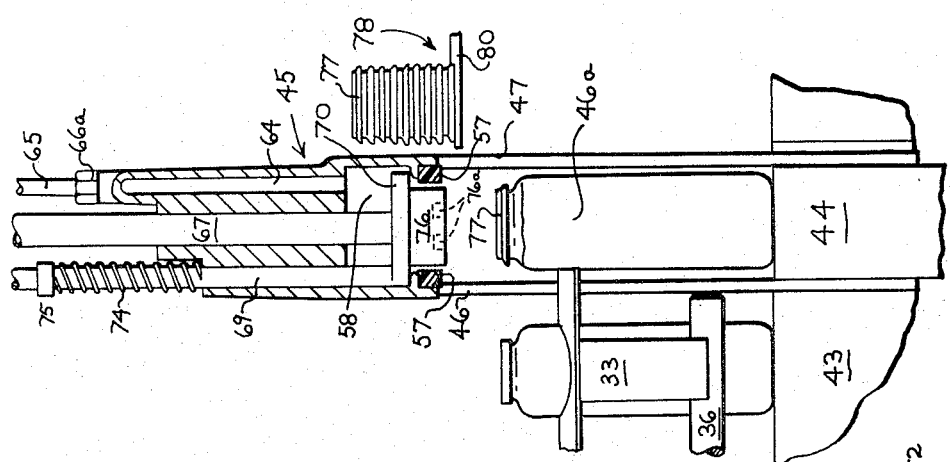
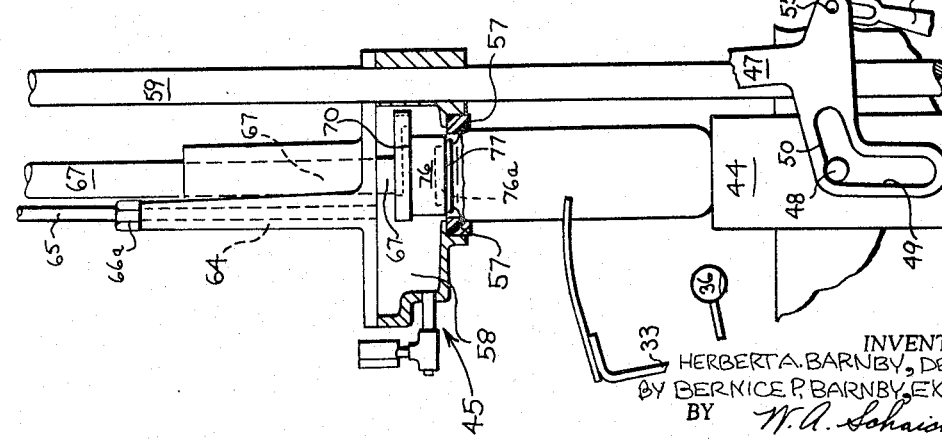

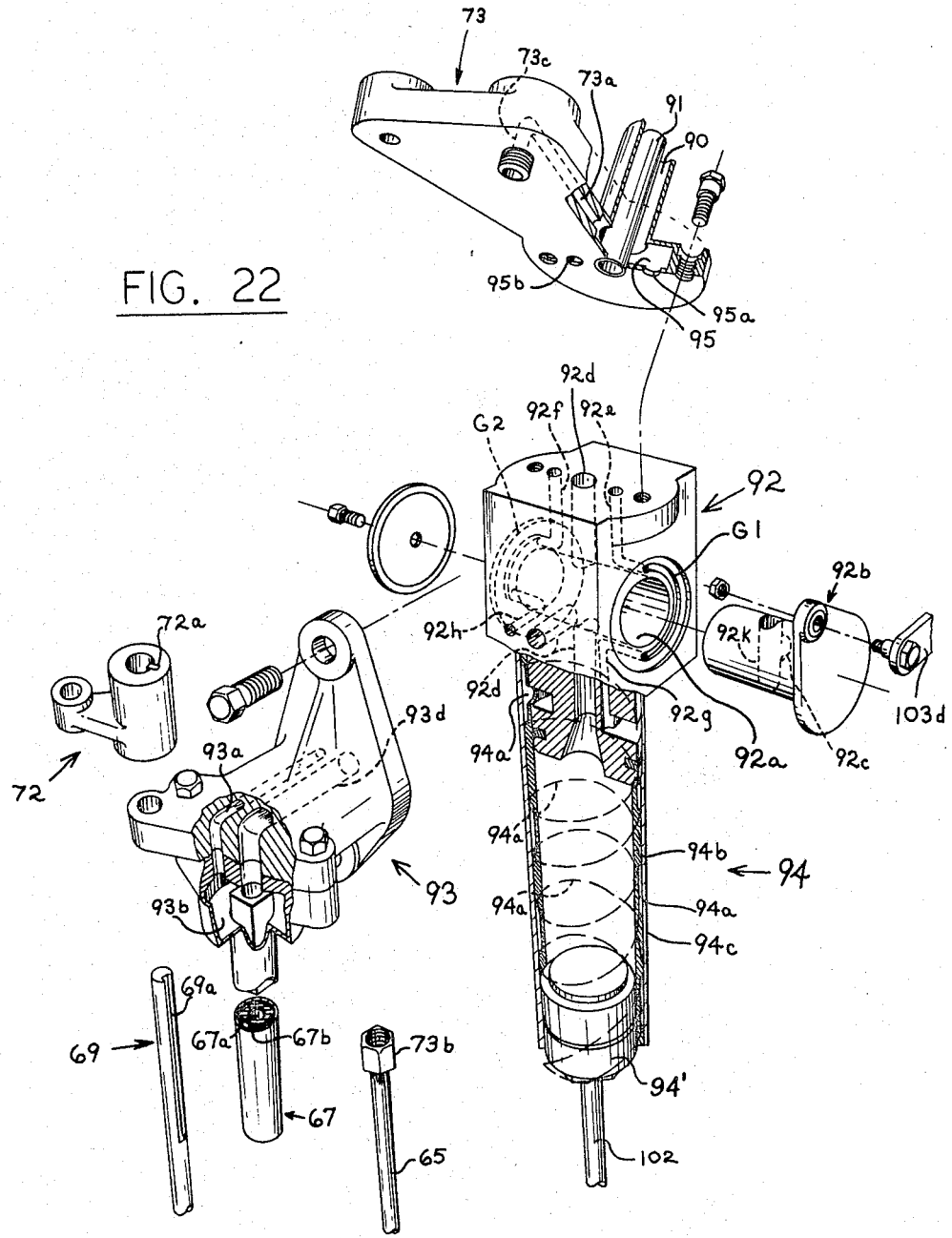

United States Patent Office 3,332,788
Patented July 25, 1967

3,332,788
STERILE FOOD PACKAGING OPERATION
Herbert A. Barnby, deceased, late of Toledo, Ohio, by Bernice P. Barnby, executrix, Toledo, Ohio, assignor to Owens-Illinois, Inc., a corporation of Ohio
Filed Nov. 12, 1965, Ser. No. 507,589
22 Claims. (Cl. 99—182)

This application is a continuation-in-part of copending application Ser. No. 160,203, filed Dec. 18, 1961 (now abandoned), and its continuation application Ser. No. 425,241, filed Jan. 13, 1965 (now abandoned), both entitled, "Method and Apparatus for Packaging." This application is also a continuation-in-part of copending application Ser. No. 285,619, filed June 5, 1963 (now abandoned), and entitled, "Sterile Food Packaging Operation."

The present invention relates to a method and apparatus for packaging a liquid or a combination liquid-solid product, e.g., food. More particularly, the present invention relates to a method and specifically designed apparatus for accomplishing packaging whereby sterile conditions are established at the zone of filling prior to, during and immediately subsequent to the accomplishing of the packaging of the liquid-containing food product concerned.

The methods and apparatus envisioned by the present invention are superior to those known heretofore in that sterility of the container to be filled, the cap closure to be applied and the surrounding environs are accomplished in a manner which is considerably improved, both as to efficiency and as to the rate of food filled container product, as compared to methods and apparatus known heretofore. Reference may be had to U.S. Patent No. 2,607,-698 and also to U.S. Patent No. 2,541,113 for a disclosure of methods and apparatus representing the conventional technique utilized by the industry heretofore. The latter mentioned patent describes a commercial apparatus and a method in which containers, such as glass containers, are filled to an appropriate level with products, whereupon the containers are sealed. Thereafter, the sealed containers are directed to retorts, e.g., pressure vessels, whereupon steam is introduced under superatmospheric pressure sufficient to provide a temperature capable of providing a sterilizing temperature. This condition is maintained for a time sufficient to destroy pathogenic and other spoilage organisms or bacteria. The sealed containers are cooled under sustained pressure. Thereafter, the sealed containers are returned to atmospheric pressure. It will be appreciated that in the process and apparatus, as described in the aforesaid U.S. Patent No. 2,541,113, the thermal destruction of organisms likely to cause spoilage is a function of time and temperature. Unfortunately, in the apparatus and method as just described, it is necessary that the contents of the sealed containers be maintained at a sufficient temperature for a period of time during which the food is adversely affected as to flavor, color and consistency.

The aforementioned U.S. Patent No. 2,607,698 discloses an apparatus and an included method wherein a continuous type cooker is utilized. This cooker includes special inlet and discharge valves that permit entrance of empty containers and exiting of the food-containing containers after their sealing and filling. This technique necessarily involves expensive and bulky equipment and necessarily includes a prolonged heat treatment which adversely affects the food product. The aforementioned U.S. Patent No. 2,541,113 additionally discloses a method which purportedly represents an improvement over the utilization of retorts or pressure vessels as envisioned in U.S. Patent No. 2,607,698. However, this purported improvement involves the utilization of large chambers, in effect rooms, equipped with air locks and ventilating mechanisms whereby conventional filling and sealing equipment may be utilized therewithin. Obviously, operating personnel must utilize this equipment whereby their entrance and exiting require special air locks. Furthermore, special sterilizing apparatus is needed for the air required for ventilation. Additionally, containers and the lids for sealing the ultimate container must be introduced through special valving equipment.

The foregoing referred to apparatus and methods represent in effect batch techniques or those which require large and expensive chambers or rooms to provide the necessary pressure temperature and cooling conditions. Furthermore, it is obvious that the maintenance of pressure and temperature conditions within such a large volume is necessarily attendant by the increased chances of failure and, as well, increased chances of spoilage by bacteria and other deleterious matter not affected by the temperature and pressure conditions which are being attempted to be maintained.

Accordingly, it is an object of the present invention to provide a method of packaging a liquid-containing food product, which method overcomes the problems and difficulties attendant the operation and technique known heretofore.

It is another object of the present invention to provide a method of packaging a liquid-containing food product, which method results in a sterile product hermetically sealed in a container and producing a sterile interior without the necessity and separate operation of completely sterilizing the whole container.

It is an additional object of the present invention to provide a method of packaging, in a sterile fashion, a sterile liquid-containing food product, which method is capable of being carried out in an easy and facile manner.

It is a particular object of the present invention to provide a method wherein sterile conditions are maintained by a particularly localized zone embrasive of the filling nozzle and the container opening, whereby the normal extensive pressure and temperature retort conditions are avoided.

It is still another object of the present invention to provide a method wherein localized sterile conditions are capable of accomplishment without necessarily overheating either the product or maintaining it for such a time as to deleteriously affect the color or palatability of the product.

It is another object of the present invention to provide a novel apparatus designed to permit the sterile packaging of a liquid-containing food product in an expeditious manner.

It is a further object of the present invention to provide an apparatus which is of relatively simple design, permitting periodic cleaning and the necessarily attendant disassembly without prolonged downtime.

It is a particular object of the present invention to provide an apparatus designed to permit expeditious sterilizing packaging of a liquid-containing food product under assuredly aseptic conditions and with a minimum of residence time for the sterilizing packaging and sealing operations.

It is another object of the present invention to provide an apparatus which uniquely operates in the establishment of a unit pressure chamber embrasive of a container filling opening, together with an arrangement for simultaneous delivery of sterilizing steam and presterilized product to the container, and finally being inclusive of a capping arrangement without affecting the sterile pressure conditions within the chamber.

It is additionally an object of the present invention to provide such an apparatus which is operable to accomplish a preliminary sterilizing steam purging of the unit chamber and closure surface.

It is also an object of the present invention to provide such an apparatus which includes provisions for receiving a measured amount of hot sterilized liquid-containing food, provisions for maintaining said food in a sealed unitary system under temperature conditions precluding contamination, and provisions for delivering said measured amount of food to the container without any chance of cooling and in such a manner that no flashing, foaming or gas entrapment occurs.

The practice of the present invention, both in terms of the sequence of steps and the utilization of the items and elements of constructional apparatus described hereinafter, are particularly desirable with respect to the packaging of what are commonly referred to as "non-acid" food products. By "non-acid" food products is meant food products which are not tart or acidic to taste as illustrated by soups, meats, vegetables and dairy products. These "non-acid" foods generally require temperatures above boiling for achievement of sterilization. In contrast, acid-containing foods, such as jams, jellies, preserves, pickles, etc., do not normally require as high a temperature or pressure conditions to achieve sterile packaging of the product, since the sterilization function is in part accomplished by the acid character of the food product. Thus, as indicated, the method and apparatus of the present invention finds its greatest application in the packaging of the non-acid foods which require temperatures ranging from approximately 220° F. to 260° F. during the packaging operation.

It is a particular object of the present invention to provide an apparatus definitive of a sterilizing and pressurized zone including provisions for locating the mouth of a container within the zone, thereafter maintained under the desired sterilizing condition, while introduction of a measured amount of food is accomplished without interruption of the desired conditions, and finally the apparatus including an arrangement for capping the filled container while in the pressurized sterilizing zone.

The above-enumerated objects, as well as many other objects of the present invention, will become apparent to those skilled in the art from the following detailed description taken in conjunction with the annexed sheets of drawings, on which there is presented a preferred embodiment of the present invention.

In the drawings:

FIG. 2 is a generally front elevation view of the apparatus shown in FIG. 1, certain portions being broken away for clarity of illustration.

FIG. 6 is a broken-away, partial perspective view of the pressurizing chamber constituting an important feature of this invention and including associated components as well as collateral equipment, such as a closure cap feed mechanism.

FIG. 7 is a perspective view, similar to that of FIG. 6, disclosing the pressurizing chamber shown in FIG. 6, but representing the location of components at a different stage of the operation of the apparatus.

FIG. 8 is a sectional top plan view of the pressurizing chamber as shown in FIG. 6, also showing an alternative position of one of the movable component parts.

FIG. 9 is a front elevational view of a portion of the apparatus of the present invention in operative relationship for initiating a complete cycle of the operation.

FIGS. 10 through 19 are similar to FIG. 9, but constituting side elevational views representing the position of component parts during subsequent stages in the cycle of the operation.

FIGS. 20 and 21 are front elevation views like FIG. 9, but representing the last two stages, after which the apparatus is ready for a repeat cycle beginning with FIG. 9.

FIG. 22 is an exploded and partially broken-away view of the upper part of the apparatus, serving to disclose particularly the flow of sterilizing and temperature maintaining steam in the apparatus.

The present invention particularly envisions a method and apparatus for bringing together a preheated container and what we may refer to as a mobile zone characterized by a pressurized sterile atmosphere and including an integral arrangement for introduction of steam and heated sterile food product. The zone is referred to as mobile in that it may be moved independently of the container and may be brought into and out of sealing, but communicating, relationship with the container in gradual sequence. The zone, in accordance with the present invention, is also characterized by provisions for a sterile steam purge which eliminates air and any other detrimental airborne contaminant prior to the establishment of sealing conditions. The zone is also characterized by a sterile food delivery arrangement which preferably is controlled to deliver food first at the bottom of the container and incrementally upwardly in such a manner as to avoid foaming. The apparatus includes provisions for sealingly capping or closing the container after filling, but while still under pressure and sterile conditions. The filling of the glass container with the food is accomplished while the container and the zone communicating therewith is under a pressure equal to or greater than the vapor pressure of the liquid-containing food product involved, whereby ebullition and boiling of the liquid component of the food product is precluded. The invention particularly envisions provisions for controlling the introduction of liquid-containing food product under controlled conditions and in timed relationship with introduced sterilizing steam, whereby temperatures destructive to bacteria are attained in timely fashion, as to the inside of the container, the opening of the container and as to the capping closure. In accordance with the present invention, the liquid-containing food product is preheated to a sterilizing temperature and thereafter a predetermined amount thereof is drawn into a reservoir chamber maintained under temperature conditions maintaining sterilizing conditions of the food product, while simultaneously a preheated container is loosely connected automatically to an isolated zone, which zone is subjected simultaneously to a sterilizing purging atmosphere of steam, followed by a pressurizing cycle and final seal, whereupon the zone is continuously supplied with sterilizing steam resulting in an instantaneous pressure condition within the zone and the included container atmosphere, followed by introduction of food together with additional sterilizing steam, said food product proceeding from the reservoir chamber and the foregoing followed by a capping operation utilizing a cap previously introduced into the pressurizing zone.

Figures 1, 1A, 1B:
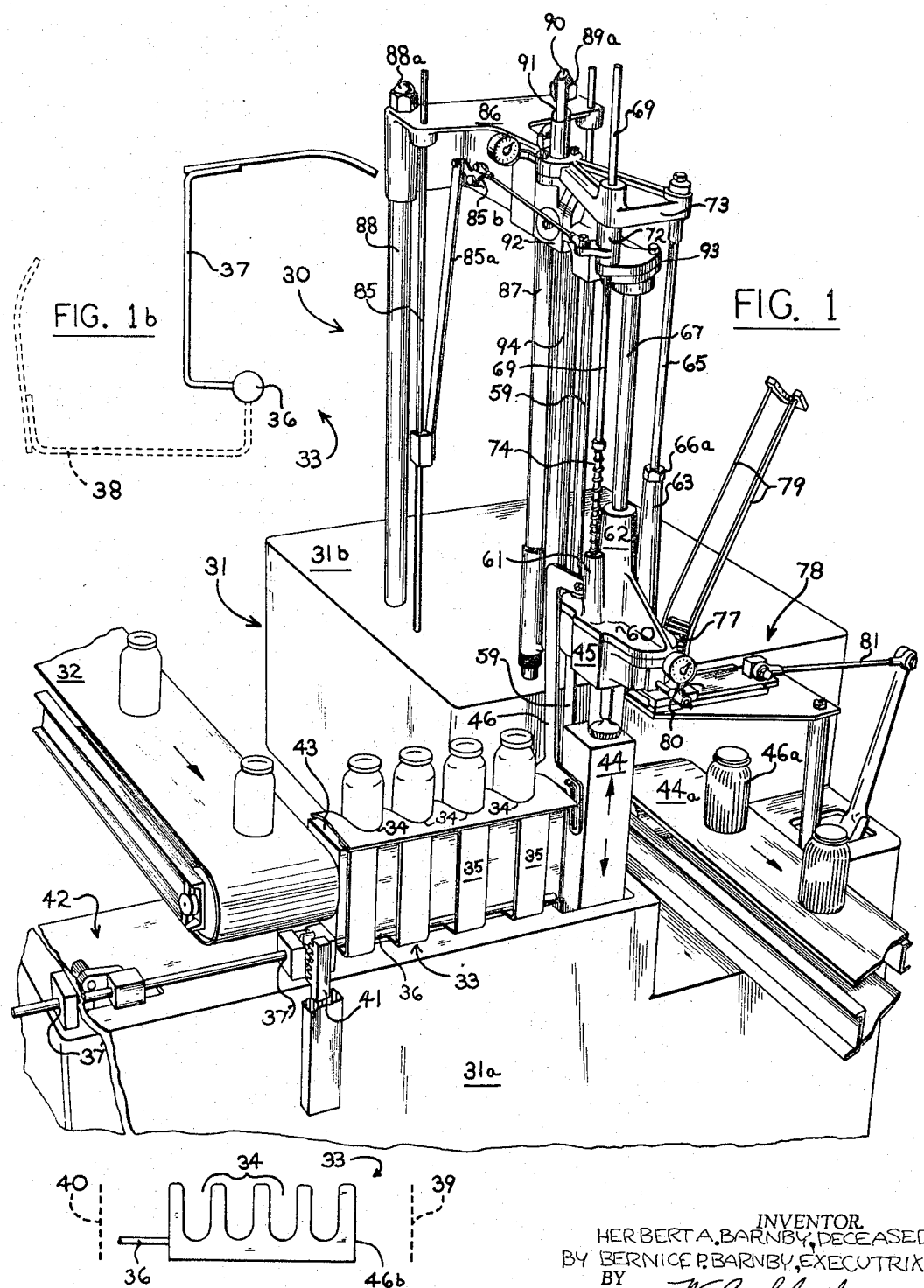
FIG. 1 is a perspective view of the overall apparatus including auxiliary delivery and take-off mechanisms.
FIG. 1a is a top plan view of a particular indexing container delivery mechanism.
FIG. 1b is a partial side elevation view illustrating the several positions of the indexing mechanism.

The aforementioned objects and desiderata of the present invention will become apparent from the following detailed description, in which reference will first be had to FIGS. 1, 1a and 1b. The apparatus of the present invention identified by the reference numeral 30 is composed of a number of cooperating elements, all of which are controlled by a conventional camming mechanism contained within the enclosure 31. Thus, the enclosure 31 contains a principal drive shaft (not shown) and suitably coaxially mounted cams mounted thereon which affect the timed and appropriate movement of the control arms, valves, etc., through cam followers and subsidiary appropriate linkages in accordance with known engineering techniques. The drive mechanism for the apparatus envisioned herein constitutes no particular part of the present invention. Rather, the invention resides in a cooperative sequence of steps accomplished by novel apparatus designed to yield a desired function in terms of the accomplishment of a unitary sterilizing food packaging operation. The practice of the invention makes possible the avoidance of plural stage batch packaging as practiced up to the present time.

The enclosure 31 as viewed in FIG. 1 includes a fore portion 31a and an aft portion 31b, both of which, in addition to housing drive mechanisms and appropriate cams, followers, etc., also serve to support structural components of the apparatus. Containers to be sterilized and filled, in accordance with the precepts of the present invention and utilizing the novel apparatus of the present invention, are delivered on a horizontal conveyor 32. The containers have desirably been preheated to a temperature selected to avoid thermal shock upon exposure of the containers to either sterilizing steam or the food product to be introduced therein during the filling operation. Preheating is also ideally desirable so that no chilling of the product occurs by reason of contact with the container, thereby maintaining sterilizing conditions with respect to all components. As the containers reach the fore end of the conveyor 32, they are engaged by the container indexing member 33, which member includes a top plate containing four notches 34, generally conforming to the peripheral contour of the containers. The indexing member 33 includes a vertical frame 35 secured to a horizontal shaft 36, journally mounted as at 37' and 37'. The indexing member 33 is adapted to move from the bottle engaging position 37 shown in full line in FIG. 1b to the fully retracted position shown in dotted outline identified by the reference numeral 38. The indexing member 33 also moves horizontally between the dotted line position identified in FIG. 1a by the reference numeral 39, representing its limit of movement in the right hand direction, and the position identified by the reference numeral 40, representing the leftmost position. Indexing member 33 alternates between the positions illustrated in FIG. 1b as controlled by rotation of shaft 36 by means of the rack arrangement 41. The travel to the right and left is controlled by the crank arrangement identified by the reference numeral 42. The rack 41 and crank 42 are coordinated by appropriate cams to function in the desired manner. The containers are engaged in the leftmost notch of the mechanism 33 while on conveyor 32, and moved to the right onto the stationary support table 43. As a container is brought onto the table 43, a filled container is pushed off of the vertically reciprocable principal support pedestal 44 onto the continuously moving take-off conveyor 44a. This is accomplished by contact of the right hand edge 46b of the index member with the filled container. The indexing member 33 then retracts to the position identified by the reference numeral 38 and then, upon activation of the crank arrangement 42, moves to the left to the position identified by the reference numeral 40, whereupon it pivots on the shaft 36 to the full line position identified by the reference numeral 37, which will bring the left-handmost notch into an engaging relationship with the next container coming along the conveyor 32, whereupon it then shifts back to the right to the position as viewed in FIG. 1. In the interval of its travel as described, a container on pedestal 44 has undergone a sterilizing filling and sealing operation. The filled containers 46a are removed by the conveyor 44a from the filling apparatus.

Figure 3:
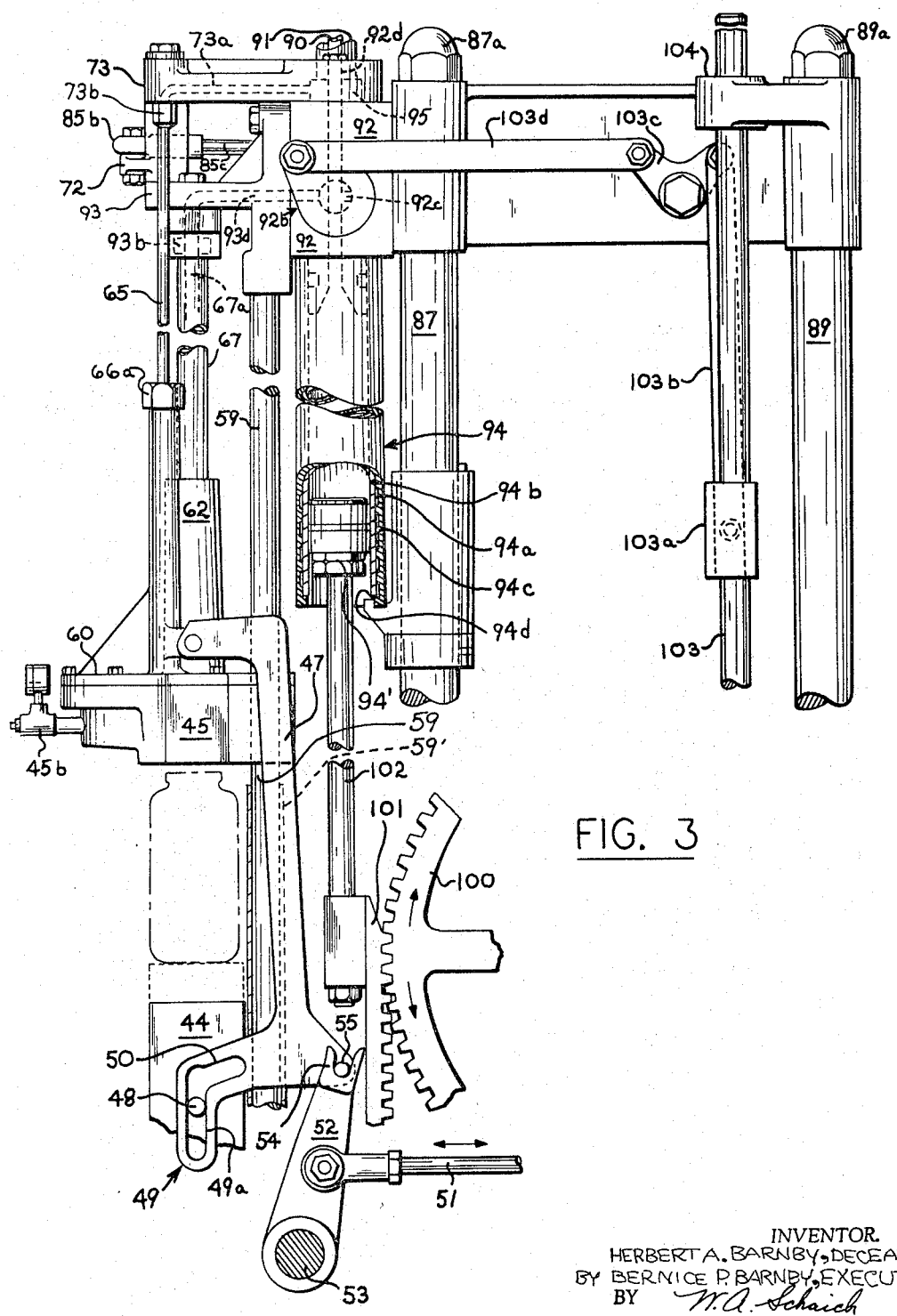
FIG. 3 is a generally side elevation view of the apparatus shown in FIGS. 1 and 2, portions being broken away for clarity of illustration.

The principal support pedestal 44 moves vertically in reciprocating fashion and timed relationship with the other operative components of the apparatus. The vertical motion of the pedestal 44 is transmitted to a just overlying head member assembly 45 by means of a pair of slotted C-clamp members 46 (FIG. 1) and 47 (FIG. 3). The upper end of the C-clamps are secured to the overhead assembly 45 and the slotted bottom end engages pins 48 extending from pedestal 44. The slot 49 (FIG. 3) includes a vertical segment 49a and a connected horizontal segment 50. The length of the vertical component permits the head assembly 45 and pedestal 44 to be moved somewhat independently. The horizontal segment allows the pedestal 44, a container thereon and the head assembly 45 to be clamped together as shown in FIG. 1 and also FIG. 7. Thus, when the pedestal 44 has been elevated so that connected pin 48 is in the upper portion of the slot, activation of a shaft 51 to the left will cause a crank arm 52 to pivot on shaft 53 so that yoke end 54 bears against a pin 55 on the lower end of the C-clamp 47, whereby the latter moves so that pin 48 rests firmly in the horizontal slot 50, locking the head 45, container and pedestal 44 integrally together.

The head assembly 45, as shown in a partially broken perspective view in FIGS. 6, 7 and 8, includes on its underside an opening 56 in which is mounted a resilient gasket 57. The opening is of a size as to receive the mouth M of a container such that the shoulder S of the container will sealingly engage the annular gasket 57, as shown in FIG. 7. The head assembly 45 includes an inner chamber 58, which chamber defines the zone which is maintained under sterilizing conditions by introduction of steam in a fashion to be described and in which chamber the filling, purging, pressurizing and capping take place. The head assembly 45 is slidingly carried on a vertical guide shaft 59. Also slidably mounted on shaft 59 is a lifting sleeve 59' that raises head assembly 45 to the position shown in FIG. 9 and sleeve 59' is raised by a lever (not shown) pivotally mounted on the bottom part of the sleeve 59' and the lever pivotally mounted on a fixed axis is operated by a cam follower and cam (both not shown) in a conventional manner. A bolted cover plate 60 is part of the head assembly 45. The cover plate 60 includes three hollow upstanding sleeves 61, 62 and 63 (FIGS. 1 and 2). The sleeve 63 of plate 60 defines a passageway 64 communicating with the chamber 58 at its lower end and receives telescopically a purge steam supply pipe 65. A gasket fitting 66a permits the pipe 65 to move within in the passageway 64 as the head member 45 is vertically moved in the course of the operation. The sleeve 62 defines a passageway 66 which slidingly surrounds a product delivery nozzle member 67 as the head 45 moves vertically, as referred to earlier. The food product supply nozzle 67 is a fixed member and does not move vertically as do the other proximately located elements of the apparatus. Sleeve 61 of cover plate 60 includes a passageway 68 through which extends a shaft 69. The lower end of the shaft 69 extending into the head has connected thereto a generally triangular shaped member 70, while the upper end extends through appropriate registering holes in a member 93, a crank arm 72 and a triangular plate 73. A spring 74 circles the shaft 69 and is generally in compression between the upper end of the sleeve 61 and a stop member 75. The function of the spring is to urge the member 70 (FIG. 6), within the chamber 58, upwardly against the lower surface of cover plate 60 bolted to head 45 (FIG. 3). Although plate 60 is not shown in FIG. 7, it is partially shown in FIG. 6 and lies flush on the upper edge 45a of the head 45. The upper end of shaft 69 is slotted as at 69a (FIG. 22), while the crank arm 72 includes a key 72a. As a consequence, the shaft 69 can shift vertically, while at the same time cranking movement of the crank 72 will cause the shaft 69 to pivot together with connected member 70 within the head 45 so that member 70 shifts between the position shown in full line in FIG. 8 and the position shown in dotted outline in the same figure. These two positions are also shown in FIGS. 6 and 7. In the position shown in FIG. 7, the lower extremity of the product nozzle 67 is unobstructed; while in the position shown in FIG. 6, the product nozzle 67 is effectively closed by the member 70. The member 70, as shown in full line in FIG. 8, also blocks the steam passageway 64 when it is riding flush against top plate 60. If, on the other hand, the head is in an up position (FIG. 6) while plate 70 blocks fill nozzle 67, then it cannot ride flush against the top plate to block steam port 64.

The member 70 has secured therebeneath a cylindrically shaped cap carrying member 76. The underside of the cap carrier 76 includes a circular recess fitted with magnets 76a whereby a closure cap 77 can be easily picked up as shown, for example, in FIG. 6. As can be seen, the cap feeding mechanism 78 includes guide rods 79 forming a chute for a vertically stacked supply of caps 77. A reciprocating slide plate or shuttle 80 includes a circular cut out 80a in its upper surface for reception of a bottommost cap. Actuation of the pivot arm arrangement 81 causes the shuttle to move horizontally to a position indexed just below the head 45, and particularly just below the cap carrier 76, secured dependingly from the member 70. The magnet in the holder 76 attracts the metallic cap 77, removing it from the recess portion 80a in the shuttle, whereupon in timed relationship the shuttle reverse itself to an out-of-the-way position beneath the supply of caps in the guide chute, whereupon another cap falls into the recess portion 80a, ready to be moved over to deliver another cap at the appropriate time, as determined by the preselected camming arrangement referred to hereinbefore. After the cap has been picked up by the cap holder, much as in the position shown in FIG. 6, the head 45 can be lowered by gravity with a downward movement of the lifting sleeve 59'. At the end of the downward movement of the head 45, the bottom end of the fill nozzle 67 is flush with the bottom surface of plate 60 and thus does not extend down into the head. The member 70, the cap carrier 76 and the cap 77 at the same time, i.e., at the end of said downward movement of head 45, are moved by plate 60 within the chamber 58 of the head against the urgement of the spring 74 about the shaft 69 if the bottom surface of the plate 60 is now slightly below the bottom end of the fill nozzle 67, but the plate 70 still obstructs downward flow of food product therefrom. It is preferred that the bottom surface of the plate 60 and the bottom end of the fill nozzle be flush, i.e., at the same horizontal plane when the head 45 is completely lowered. In this position, the member 70 may be pivoted by shaft 69 which moves the cap carrier 76 to the position shown in dotted line in FIG. 8, whereby it no longer obstructs the fill nozzle 67 or the mouth M of the container registered below the opening 56 and gasket 57 in the head 45.

The member 70 includes an arcuate groove 82 in its upper surface. One end of the groove connects with a vertically bored passageway 83 extending downwardly through the thickness of the member 70. The groove 82 and the passageway 83 provide a channel of communication between the steam passageway 64 and the chamber 58, constituting the pressurized zone of sterilization, filling and capping. Thus, the groove permits continous introduction of purging steam into the head, regardless of the lateral position of the member 70, with the single exception that when it is in its feed nozzle closing position, shown in solid outline in FIG. 8, and at the same time the upper surface of the member 70 is flush with the lower surface of plate 60, the ear portion 84 of plate 70 will temporarily block the steam conduit 64 (see FIGS. 8 and 10).

Figures 4, 5:
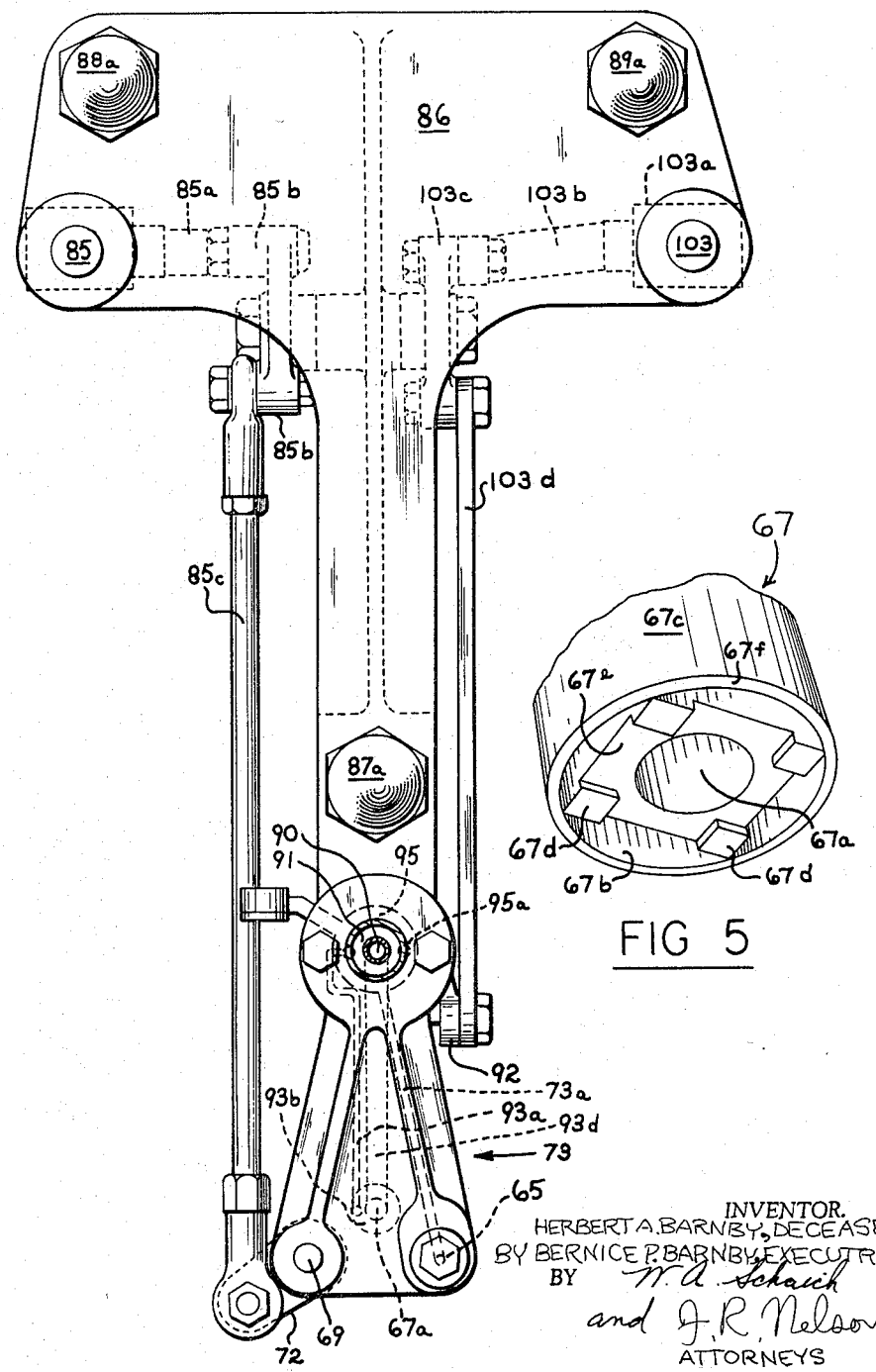
FIG. 4 is a top plan view of the apparatus shown in FIGS. 1–3.
FIG. 5 is a perspective view of a filling nozzle in accordance with a preferred embodiment of the present invention.

The feed delivery nozzle 67 is shown in more detail in FIG. 5. Thus, it is actually composed of two concentric pipes, the inner pipe 67a constituting a conduit for food to be packaged while the space 67b, between it and the outer pipe 67c, constitutes an annular passageway for steam connected to a source in a manner to be described hereinafter. The lowermost terminus of the inner pipe 67a is machined to define four spaced pedestals 67d, defining channels 67e, connecting the pipe 67a with outer steam passage 67b. The spaced pedestals 67d are preferably flush with the lowermost edge 67f of the outer cylinder 67c. The channel 67e allows communication of the annular passageway 67b and the food inlet 67a, even when the lowermost edge 67f is against a flush surface as, for example, against the upper surface of member 70. By reason of the construction as just described, a continual play of steam on the exposed food at the outlet of food line 67a is assured, whereby cooling of the food below desired temperature is avoided. Additionally, this construction insures maintenance of sufficient pressure to avoid boiling of food.

Lateral movement of the cap carrier assembly 70 and 76 on shaft 69 within the head 45 is effected by up and down movement of control rod 85 which is journally mounted in framework 86 and extends down into enclosure 31b for vertical activation by an appropriate cam follower riding on a cam (not shown). Vertical movement of the control rod 85 actuates tie rod 85a, pivoting toggle arm 85b which is translated via arm 85c to the crank arm 72 which, by reason of the key connection, rotates shaft 69. Any suitable spline connection can be used for this connection. The framework 86, in which the vertical control rod is supported, is in turn mounted on three principal support shafts 87, 88 and 89, arranged in triangular configuration, as may be seen by reference to the plan view shown in FIG. 4. In this view, the cap screws 87a, 88a and 89a respectively connect the framework 86 to the corresponding support shafts 87, 88 and 89. These are in turn supported on the enclosure 31b.

Head 45 is provided with a combined pressure relief valve and pressure indicating device 45b communicating with the chamber 58, in order that the operator can readily observe the pressure within the head and also preventing any steam pressure accumulation since live steam is being essentially continuously introduced therein.

The liquid-containing food to be packaged in the apparatus of the invention and the necessary steam are introduced through a concentric pair of pipes 90 and 91 (FIGS. 1, 2 and 22) connected to a distribution plate member 73. This distribution plate is bolted to a valve housing 92, in turn bolted to an additional distribution member 93. Reference may be had to FIG. 22 for an illustration of the details of construction, enabling and defining the flow of the liquid food product and the sterilizing steam. The flow of the food product will be described first, followed by a description of the flow of the steam through the assembly of apparatus referred to. The inlet food conduit 91 proceeds through the plate 73 and into the valve block 92. The block 92 contains a transverse hole 92a in which is seated a valve plug 92b. The plug includes a bored normal passageway 92k and a leg 92c normal thereto defining a T. The valve block 92 contains three bored holes 92d, which cooperate with the passageways and the plug when assembled therewith to define in effect a three-way valve which, in one position, sends food products straight downwardly through the block 92 into a cylinder 94, serving as a reservoir for food when the piston 94' is in its down position, as shown in FIG. 22. This cylinder contains a measured quantity of food, selected by appropriate stroke of piston 94' to fill the container to be filled with liquid food product. Upon proper location of the valve plug 92b and upward movement of the piston 94', the predetermined measure of food will proceed through the three-way valve and through conduit 93d in the number 93, downwardly into inner pipe 67a of delivery nozzle 67. The food product lines always remain filled with food product. After filling of the container, the valve can again be switched, connecting the food inlet pipe 91 directly with the reservoir 94 and another appropriate volume of liquid-containing food product can be drawn into the reservoir. The liquid-containing food as delivered via pipe 90 has previously been brought to sterilizing temperature by passage through a high surface heat exchange unit (not shown). The present apparatus includes provisions for maintaining the liquid food at such temperatures as it proceeds through the apparatus of this invention as will now be described.

The steam entering the annular space between pipes 90 and 91 proceeds into a central passageway chamber 95 in the part 73. The part 73 includes a passageway 73a proceeding laterally from the chamber 95 to connect with a vertical hole 73c in a corner boss. The hole 73c connects via a fitting 73b connecting with pipe 65 which, as referred to earlier, connects with a passageway 64 in the upper head extension, which in turn directs the steam to the chamber 58. This constitutes the purge steam line which operates continuously, except when the ear portion 84 of member 70 blocks the outlet 64. The bottom surface of part 73 is provided with holes 95a and 95b which proceed from chamber 95 to connect with matching holes 92e and 92f in the valve block 92. The supply of steam has thus been divided into three separate streams, one of which constitutes the purge steam. One of the remaining two streams, identified by the reference numeral 95a, proceeds into the block and arcuately about a groove G-1 formed therein and communicating via passageway 92g with a helico passageway 94a formed in the double walled (94b and 94c) cylinder 94. A vent, not shown in FIG. 22 but identified as 94d in FIG. 3, is formed in the bottom of the cylinder 94 allowing steam to escape. The steam in passageway 94a helically surrounding the hot food product while in the reservoir cylinder 94 maintains it uniformly at a sterilizing temperature.

The steam proceeding from distribution plate 73 via the opening 95b proceeds down into passageway 92f in block 92 and an arcuate groove G-2 formed in the block 92a on the side opposite groove G-1 to connect via passageway 92h with a passageway 93a in the part 93. This communicates with an annular chamber 93b which surrounds the inner food conduit 67a and connects with the annular passageway 67b surrounding the feed supply 67a. As can best be seen by reference to FIG. 2, the steam travel has been directed by the construction of the cooperating parts to closely approximate that of the food to be packaged, whereby its temperature is maintained assuredly at a safe level.

The piston 94' referred to hereinabove, is moved within the reservoir cylinder 94 by appropriate rotation of geared wheel 100 engaging a rack 101 secured to a shaft 102 connected to the piston 95.

The three-way valve 92 is shifted between its two positions by vertical reciprocation of control rod 103, journally mounted as at 104 (FIG. 3) for sliding reciprocation in the upper framework 86. The control arm 103 has adjustably connected thereto, as at 103a, a linking rod 103b which is pivotably connected to a toggle arm 103c. Bar 103d in turn connects the toggle arm 103c to the plug member 92b of the valve in offset fashion as shown (FIGS. 3 and 22) to, as indicated, move the three-way valve between its two positions, one connecting supply of liquid food (line 91) with the reservoir 94 and the other position conecting the reservoir with the feed delivery nozzle 67.

To further aid in an understanding of the sequence of steps involved in the filling operation and the intercooperation of the many parts and features of the present invention, there will now be described a cycle of a complete filling operation with respect to a single container. For this description, reference should be had to FIGS. 9–21, wherein there is disclosed, in somewhat schematic form, a series of views of a container and the contiguous and cooperating parts of the packaging apparatus. Each view in sequence represents a successive stage of the cycle.

Referring now to FIG. 9, we can assume that the cap shuttle plate 80 has just retracted after delivering a cap closure 77 to the magnet-bearing cap carrier 76. Magnets are identified by reference numeral 76a. The bottle has previously been indexed on the pedestal 44 by means of the index member 33. The cap carrier 76 is located underneath the feed nozzle 67. The head 45 has been raised by the lifting sleeve 59', which is shown only in FIG. 3. In the view of FIG. 9 it would be behind the container and pedestal 44 and would be abutting head 45 that it has raised. Since the cap carrier is in the path of the distribution feed nozzle 67, it cannot rise with the head 45 but instead is held, while the head raises in order to that the cap carrier 76 projects down through the opening defined by the gasket 57 in the position to have picked up the cap 77. Purge steam is already entering the chamber 58 via the inlet 64. FIG. 9 has been shown schematically as a front view in order to show the cap feeding mechanism 78.

In FIG. 10, the container indexing mechanism 33 as viewed now from the side, similar to the view of FIG. 3, has started to retract, pivoting back about shaft 36. The pedestal 44 has moved up slightly, reducing the clearance opening between the shoulder of the container and the gasket 57. Also the head 45 has lowered, providing clearance to the left of the cap holder 76 in the chamber 58 in order that it and member 70 may pivot out of the way by actuation of the shaft 69, as described hereinbefore. This is initiated as illustrated in FIG. 11. Immediately as the cap holder starts moving to the left, steam conduit 64 connects with groove 82 in member 70 and proceeds ultimately through the aperture 83 into the chamber 58 to fully initiate the steam purge of the entire chamber or zone, airborne contaminants and excess steam leaving through the clearance between the gasket 57 and the shoulder of the container. It can also be seen that the indexing mechanism 33 is further retracted. After the purge has been contined for a short time, the clamp arm 47 is moved by yoke arm 52, whereby the horizontal slot 50 engages the pin 48, to provide relative movement between the pedestal 44 and the head 45 so that the container shoulder assumes a tight-sealing relationship with the gasket 57 and thereby essentially sealing the chamber 58. Complete pressurization occurs instantaneously as steam continues to enter the chamber 58 via the steam inlet passages described. The pressure is allowed to build up to that sufficient to equal or to exceed slightly that of the particular liquid product which is being packaged, approximately 5 to 25 pounds per square inch. The cap carrier 76 has moved further to the left.

In FIG. 12, the cap carrier has moved a little further to the left, while the indexing mechanism 33 has reached almost its full down position.

FIG. 13 illustrates the fact that the cap indexing member 33 has retracted still further away from the container. At the same time, sufficient steam continues to enter through the purge line 64, into the groove 82 of member 70 and then into the chamber 58 to maintain the desired temperature and pressure.

FIG. 14 illustrates the fact that the container indexing mechanism 33 has retracted still further, while the cap carrier assembly 70 and 76 has pivoted completely to the left, as shown, whereby the space above the container is unobstructed and the fill nozzle 67 is uncovered in order that the filling operation may proceed.

Figure 15:
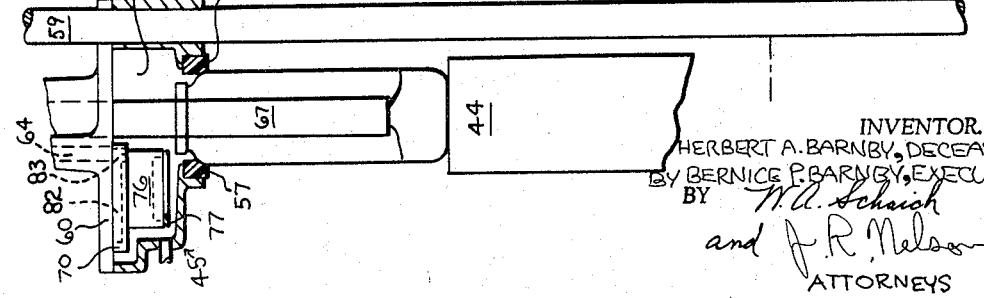

In FIG. 15, the cap holder is shown moved completely over to the left. The feed supply nozzle 67 up till now has been in the off position by appropriate control of the valve 92. In FIG. 15, with the cap holder assembly 70 and 76 out of the way, the pedestal 44 and the connected head have been raised so that the filling tube 67 extends downwardly proximate to the bottom of the container. Immediately, the product valve 92 is open, while simultaneously the piston 95 in the reservoir chamber 94 is energized to direct the precharged measure of food therein over and down the feed discharge pipe 67. Steam still enters through the purge line 64, groove passageway 82 and vertical hole 83. Similarly, steam is issuing from the annular passageway 67b surrounding the liquid feed line 67a. The pedestal 44 is controlled to lower slowly as the product issues into the container in order that the level of the food approximates the withdrawal of the feed discharge tube whereby turbulence is avoided.

Figure 16:
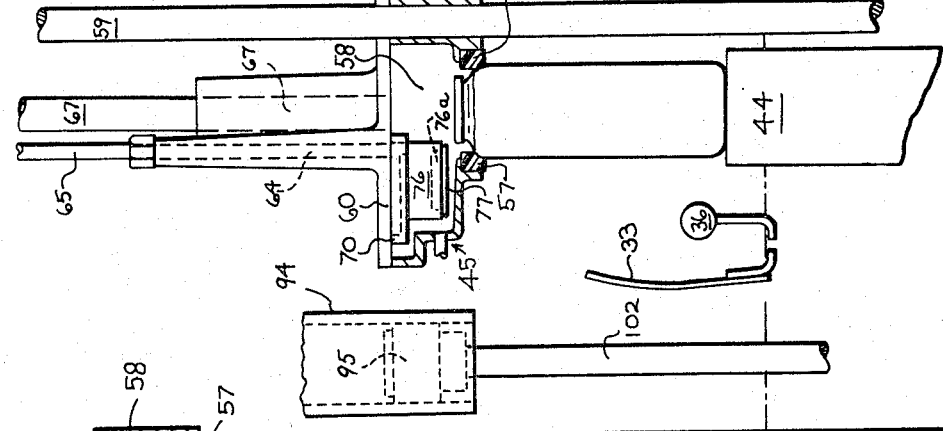

FIG. 16 illustrates the relative position of the parts of the apparatus as the filling of the container has been completed. Thus, the pedestal 44 has moved downwardly, allowing the head assembly 45 to slide down the rod 59 but at the same rate because of their connection through the clamp arms 46 and 47; however, the filling nozzle 67 remains fixed.

Figure 17:
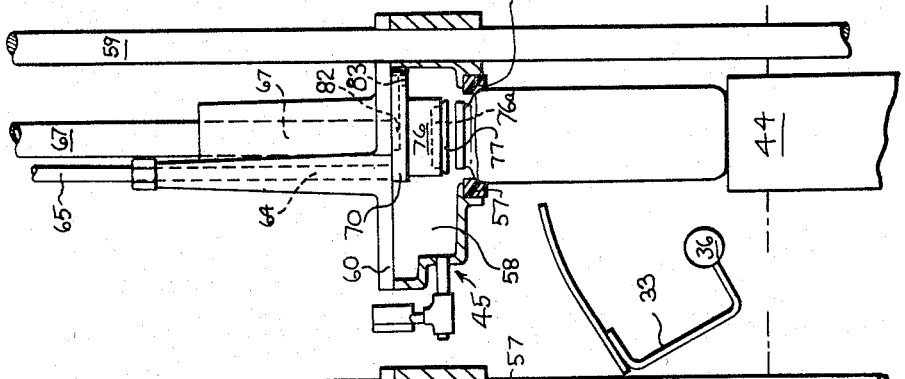

In FIG. 17, it can be seen that the cap holder assembly 70 and 76 bearing the new steam sterilized cap 77 has pivoted over to the right in indexed relationship with the container. Movement of the cap holder was effected by an upward movement of the control arm 85 (FIG. 2) which has been translated via the linking arm 85a, to the toggle arm 85b and the member 85c, to the crank member 72 which is connected to the shaft 69 which carries at its lowermost extremity the member 70 to which is secured the cap holder 76. With the member 70 in the position shown in FIG. 17, the lowermost extremity of the fill tube 67 is generally in flush relationship with the upper surface of the said member 70. The pedestal container and head assembly 45 are still in their clamped unitary relationship whereby the zone 58 is still under greater than atmospheric pressure, thereby precluding any ebullition or boiling of the liquid in the container. This FIG. 17 also illustrates that the indexing member 33 has commenced its travel upward, rotating about the shaft 36. At the same time, the indexing member 33 has moved to a position at the left, as viewed in FIG. 1, in order that it will be in proper position to pick up another container delivered by the conveyor set-up 32.

Figure 18:
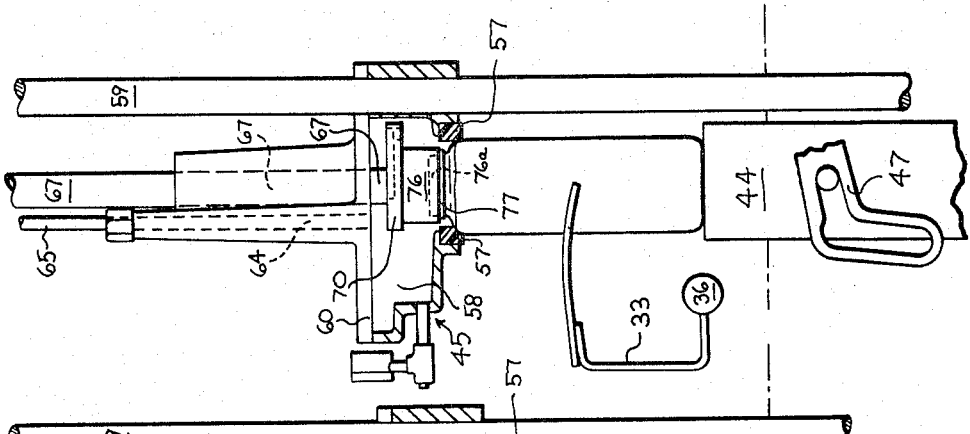

FIG. 18 illustrates the capping or closing of the container. Thus, the pedestal 44 has risen slightly, which in turn causes the head assembly 45 to rise, causing the lower terminus or end of the filling nozzle 67 to be the only component bearing against member 70 which is fixed. This action is translated through the cap holder 76 and serves to press fit the closure cap 77 down over the mouth of the container. At the same time, the indexing member 33 has moved into container-contacting position and is ready to move the now-capped container away from the filling zone and deliver a new bottle or container. Similarly, the apparatus is ready for an unclamping action of the lower part of the C-clamp members 46 and 47.

In FIG. 19, the referred to unclamping has been accomplished by a movement to the right of pivot arm 52, translated against pin 55. This causes the slot to move to the right with respect to pin 48, so that as pedestal 44 is lowered further, the head 45 now abutting lowered sleeve 59' remains at this height, thereby releasing the pressure of the shoulder of the container against the gasket 57 and ultimately separating the container and the head 45 and thereby releasing to the atmosphere the gaseous pressure in the head 45. Thus in this embodiment of the present invention the means to communicate the chamber of the filling head with the atmosphere is provided, after the unclamping of C-clamp members 46 and 47, by the sleeve 59' which prevents lowering of the head 45 when there is further lowering of pedestal 44. Of course, release of the elevated gaseous pressure in the chamber to the atmosphere can be provided by a valved outlet (not shown) through the head which is opened only when it is desired to depressurize the chamber of the head 45, i.e., after the container has been hermetically sealed by the closure and the means to close the gas-introducing means through the gas inlet has been closed.

In FIG. 20, which is a similar view to FIG. 9, that is, looking at the pedestal 44 and head assembly 45 from the front, the pedestal 44 has moved downwardly while the head 45 has been moved upwardly by the sleeve 59', which has been raised. The cap holder 76 and associated member 70, however, remains in the same relative vertical position by reason of its being backed up against the filler nozzle 67. As a consequence, the cap holder 76 extends downwardly with respect to the annular gasket 57. In this position, it is ready to receive another cap from the cap feeding assembly 78. Additionally, the indexing container member 33 has moved to the right in a position for movement of the filled container 46a off to the right on the conveyor 44a.

In FIG. 21, we see the filled and capped container moving on to the conveyor 44a by the action of the indexing member 33. At the same time, a fresh unfilled container is moving into position on the pedestal 44. Simultaneously, the shuttle plate 80 has moved beneath the cap holder 76 bearing a new closure in its recess and, by reason of the magnets in the holder 76, it has picked up the cap whereupon the shuttle mechanism will retract. This action is also illustrated in FIG. 6. Upon completion of this step, the arrangement is back to the position illustrated in FIG. 9, and a cycle is ready for a repeat of the sequences illustrated in the just described FIGS. 9–21. Since the destruction of growing and spore forms of bacteria is dependent upon both time and temperature, it is most desirable in some cases to direct filled containers to a "hold" tunnel or chamber directly from the filling pedestal 44. In such tunnel or chamber the temperature is maintained at the 220° F.–260° F. range for a time insuring complete destruction of spoilage organisms associated with the particular food product being packaged.

The apparatus, as described herein, represents a single head filling operation with which it is possible to accomplish from about 10 to 20 filling cycles per minute. If a faster production rate is required, provisions can be made for a plurality of heads arranged off of a common rotary table arrangement.

In such case, the conventional camming mechanism was designed for time sequence and for rate, direction and distance of movement of the pedestal 44, the shafts 51, 85 and 103, and the geared wheel 100 corresponding to speeds etc. of operation of multiple filling heads on a rotary machine using the present invention. Conventional circular cam rails or plates can be used with cam followers with crank arms operated where needed by the latter, as present in commercial rotary filling machines, to provide such movements, etc. Of course, instead of mechanism 33 to deliver bottles from a conveyor to the heads in sequence and to remove them to a receiving conveyor, conventional star wheels can be used such as shown in U.S. Patent No. 2,968,900, granted to Bjering. Instead of the C-clamp members 47 that move the head 45 in unison with the pedestal 44 and determine the rate at which the head 45 moves down to its lowest position, conventional cam rails or plates and cam followers can effect this movement.

While steam has been disclosed herein as the gaseous element for producing the pressurized and elevated temperature conditions, it is to be understood that steam in combination with one or more other gases can be used where advantageous, the choice being dependent upon the nature of the food to be packaged.

The apparatus, including all of its parts operating in the sequence and manner described hereinabove, provides a novel arrangement for the efficient accomplishment of the method of packaging a liquid-containing product as disclosed and claimed in my copending patent application, being filed with the present application and being based primarily on said copending applications Ser. Nos. 160,-203 and 425,241.

The apparatus of the present invention has been disclosed as directed to a pressure cap type of closure. The apparatus of this invention obviously can be modified to apply screw-type and lug-type closures.

From the foregoing detailed description, it is readily apparent that the apparatus of the present invention functions admirably in the carrying out of a sequence of operations whereby a heated container is delivered to the filling situs, steam purged, pressurized, filled with sterilized liquid-containing food product and sterilizingly capped, or otherwise hermetically sealed. All of the foregoing is accomplished in an extremely rapid cycle and in an essentially unitary operation.

As disclosed in said copending applications Ser. No. 160,203 and Ser. No. 425,241 food products packaged by the method of the present invention include milk and baby food formula.

The apparatus, which makes possible the foregoing operation, includes several very essential cooperating subassemblies and elements, principally among which is the head assembly which is definitive of a chamber wherein the zone of particularly desirable conditions may be established and maintained. The head assembly includes an opening for receiving the filling opening of a bottle or a container. The head assembly additionally includes means for introduction of sterilizing steam in purge fashion, and additionally contains a movable cap carrier member which is constructed and controlled to pick up a cap while in one position in its movement, and thence retract into a recessed position while a filling operation takes place, utilizing the filling nozzle which also incorporates novel features of construction. Thus, the latter includes a concentric channel for live steam, maintaining the liquid-containing food at an elevated sterilizing temperature. The lower terminus is uniquely designed to assure steam contact of food and also avoid thereby any leakage of the food product from the nozzle.

Another feature of the present invention involves the combination of the head assembly with a pedestal, the two being adjustably connected, permitting relative movement whereby a container on the pedestal can be moved into locking sealed relationship with the opening of the head assembly, whereby there is provided a unitary design, self-contained retort system.

Another feature of the present invention involves the combination of the foregoing with a reservoir system including an arrangement permitting a measured amount of sterilized food product to be sterilizingly maintained temporarily in the reservoir chamber ready for delivery through the food supply nozzle to the zone, and particularly to the container.

Another desirable feature of the invention involves the relative movement of the unitary head container pedestal assembly and the fixed food supply nozzle, whereby the latter can be located so as to deliver food right at the bottom of the container, coupled with gradual movement of the referred to assembly, while filling continues so that the nozzle tracks the upwardly moving product line, e.g., as the container moves down.

Cooperating with the foregoing and constituting a novel coacting component is the cap shuttle feed mechanism. Also cooperating in the accomplishment of the entire operation is the unique container indexing member which functions in proper fashion to deliver containers to be filled to the pedestal and, at the same time, delivering the just filled container to a take-off conveyor.

It is a particularly desirable feature of the present invention that two steam inlets to the chamber or head assembly is provided, whereby sterilization temperatures of all of the associated contiguous parts, particularly the container, food nozzle, enclosure cap, can be assured.

The particular construction of the cap carrier member movably located within the head assembly is eminently desirable in the provisions for appropriate channel passageways, whereby, regardless of its movement, steam is directed to the pressurized zone or chamber, insuring an initial purging action, complete pressurization, etc.

The apparatus of the present invention can be restated as an apparatus for packaging liquid-containing food product which has (1) a support structure; (2) a filling head mounted on the support structure and having a gas inlet, a different inlet for food product, an aperture and a bottom opening; (3) a container support means; (4) means to provide relative movement between the container support and the filling head from one relative position to another relative position; (5) means to close the opening of the filling head when the container is at the other relative position provided by the relative movement; (6) means to introduce pressurized gas through the gas inlet; (7) means to selectively close and open the gas-introducing means; (8) means in the head to support a container-sealing means and having an upper extension passing through the aperture of the head; (9) means to provide simultaneous relative movement in a vertical direction of the container support means and the filling head with respect to the container-sealing means; (10) means to introduce food product through the different inlet and to discharge food product into a zone in the head in which at least the open end of the container can be located; (11) means to selectively close and open the product-introducing means; and (12) means to communicate the head with the atmosphere.

The filling head can be mounted on the support structure for relative vertical movement. The aperture in the roof of the head receives part of an upper extension of the container-sealing support means. The gas inlet is not required to be in the roof of the filling head, but in the preferred embodiment the different inlet is in the roof. It is preferred that the opening, that receives at least a part of a container, be in the bottom of the filling head and be provided with a ring of resilient material for abutment against the shoulder of the container to provide a hermetic seal. When the gas inlet and the different inlet are in the roof of the filling head a plate can be used to selectively open and close both the gas inlet and the different inlet in the desired sequence and this plate is mounted for lateral movement between several positions, preferably by movement about a vertical axis. Also, it is preferred the plate have an arcuate groove and hole, as described above, to provide this unitary means to open and close both inlets in the filling head.

The apparatus can further include means to provide simultaneous movement of the head and the container support means with respect to the discharge bottom opening of the product-introducing means so that the latter can be within the container at the start of the filling and can be gradually raised as product is introduced into the container. To provide this, simultaneous movement arms, such as C-clamps described above, are pivotally mounted on the filling head and have slots for suitable engagement with pins on the container support means.

The method of the present invention can also be restated as a method of packaging a liquid-containing food product, such as baby food formula, in a container by the steps of: (1) supporting a filling chamber having a bottom opening; (2) supporting a closure in alignment with and at an elevation just below said opening; (3) lowering the filling chamber until the supported closure is at a first position above the opening and entirely within the chamber; (4) supporting a container having a top open end below and spaced from the opening of the chamber; (5) raising the supported container until a part of it can be abutted at the opening to close the chamber; (6) moving laterally the supported closure within the chamber now closed until out of alignment with the open end of the container; (7) communicating a gas inlet of said container with a source of pressurized gas to provide an elevated gaseous pressure in the chamber; (8) flowing the food product through a different inlet of said chamber into the container; (9) ceasing said flow; (10) moving the closure laterally to the first position within said chamber; (11) raising in unison the chamber and the container to force the supported closure onto the container in hermetically sealing relationship; (12) closing communication between the gas inlet and the source of pressurized gas; (13) releasing pressure in the chamber through an inlet of the chamber to the atmosphere; (14) lowering the container and the chamber in unison; and (15) lowering the container only, while supporting the chamber. Preferably, the lateral movement of the supported closure is about a vertical axis that extends through the chamber but is spaced from the closure. In the method a gas, such as steam, is used to purge the container just prior to its being placed entirely to the desired extent and prior to closing the opening of the chamber. Also the method contemplates the inclusion of the step of raising the chamber, the container and the closure so as to insert the product-introducing pipe into the container before the start of the step of flowing product into the container. This step is followed by a lowering of the chamber, container and the closure during the flowing of product into the container.

Modifications may be resorted to without departing from the spirit and scope of the appended claims, which alone limit the interpretation of the method and apparatus, disclosed hereinabove solely for purposes of illustration as required by the patent statutes.

What is claimed is:

1. Apparatus for packaging liquid-containing food product, which comprises:
   (1) a support structure;
   (2) a filling head mounted on said support structure, said filling head having:
      (a) a gas inlet;
      (b) a different inlet for food product;
      (c) an aperture for receiving part of an upper extension of a support for container-sealing means; and
      (d) an opening for receiving in said chamber at least a part of a container having an open end;
   (3) a container support means;
   (4) means to provide relative movement between said container support and said filling head from a spaced-apart position at which the container can be moved laterally onto and off said container support means to a closer filling position in which at least the open end of the container in upstanding position on said container support means is in said filling head with said open end of the container spaced from the roof of said filling head;
   (5) means to close said opening of said filling head when the container is at the filling position;
   (6) means to introduce pressurized gas through said gas inlet into said filling head;
   (7) means to selectively close and open said gas-introducing means;
   (8) means in said head to support said container-sealing means and having an upper extension passing through said aperture of said filling head;
   (9) means to provide simultaneous relative vertical movement between said support for said container-sealing means and said container support means at said filling position and between said container-sealing means and said filling head to bring into operative relationship the container at said filling position and said container-sealing means into a sealing position and then to separate the container and said container-sealing supporting means;
   (10) means to introduce food product extending into said different inlet and having an opening to discharge food product into a zone of said filling head in which at least the open end of the container can be located;
   (11) means to selectively close and open said product-introducing means; and
   (12) means to communicate said head with the atmosphere.

2. Apparatus for packaging a liquid-containing food product, which comprises:
   (1) a support structure;
   (2) a filling head mounted on said support structure for relative vertical movement between said support structure and said filling head, said filling head having:
      (a) a gas inlet;
      (b) a different inlet for food product;
      (c) an aperture for receiving part of an upper extension of a support for container-sealing means; and
      (d) an opening for receiving in said chamber at least a part of a container having an open end;
   (3) a container support means;
   (4) means to provide relative movement between said container support and said filling head so that the container is moved between a container-receiving and discharging position to a filling position in which at least the open end of the container in upstanding position is in said filling head with said open end of the container spaced from the roof of said filling head;
   (5) means to close said opening of said filling head when the container is at the filling position;
   (6) means to introduce pressurized gas through said gas inlet into said filling head;
   (7) means to selectively close and open said gas-introducing means;
   (8) means in said head to support said container-sealing means and having an upper extension passing through said aperture of said filling head;
   (9) means to provide simultaneous relative vertical movement between said support for said container-sealing means and said container means at said filling position and between said container-sealing means and said filling head to bring into operative relationship the container at said filling position and said container-sealing means into a sealing position and then to separate the container and said container-sealing support means;
   (10) means to introduce food product extending into said different inlet and having an opening to discharge food product into a zone of said filling head in which at least the open end of the container can be located;
   (11) means to selectively close and open said product-introducing means; and
   (12) means to communicate said head with the atmosphere.

3. The apparatus of claim 2 wherein said opening of said filling head is in the bottom of said head and wherein said means to close said opening is a ring of resilient material mounted on said head at said opening to receive against said ring in hermetically sealing relationship the shoulder of the container on said container support means at said filling position.

4. The apparatus of claim 3 wherein said gas inlet and said different inlet of said filling head are in a common plane at the bottom surface of the roof of the filling head and further including a unitary means for said selective means to open and close said gas inlet and said selective means to open and close said different inlet, said unitary means including:
   (1) a plate mounted for relative lateral movement between a first position spaced from both inlets, an intermediate position abutting and closing only said different inlet, and another position abutting and closing both inlets, whereby said chamber can be purged with gas and then pressurized prior to the opening of said different inlet for food product and can be depressurized after closing said different inlet; and
   (2) means to move said plate between said first position, said intermediate position, and said another position.

5. The apparatus of claim 4 wherein said plate:
   (1) is mounted for said lateral movement about a vertical axis; and
   (2) has an arcuate groove in its top surface and a hole adjacent one end of said groove and extending from said groove to the bottom of said plate, said groove and said gas inlet being radially equidistant from said axis and located so that said gas inlet is spaced from said groove when said plate is in an abutting position to close said different inlet for the product and is above said groove in the intermediate positions of said plate and above said hole when said different inlet for the product is open by said plate being spaced from said different inlet.

6. The apparatus of claim 5 where said container-sealing support means is a closure support including a magnet and is mounted on said plate for arcuate movement within said chamber and is spaced from said hole of said plate.

7. The apparatus of claim 3 and further including:
(1) means to provide simultaneous relative movement of said filling head and said container support means with respect to said discharge opening of said product-introducing means to bring said discharge opening closer to said container support means for initial filling and farther away during filling and to maintain the container in abutment with said ring for gaseous pressure maintenance.

8. The apparatus of claim 7 and further including means urging said head to a lowermost position and wherein said discharge opening of said product-introducing means is at a fixed elevation and wherein said simultaneous relative movement means is constructed to provide upward movement of said head by said container support means and to limit simultaneous downward rate of movement of said head by said urging means to the rate of lowering of said container support means.

9. Apparatus for packaging liquid-containing food product, which comprises:
(1) a support structure;
(2) a filling head mounted on said support structure, said filling head having:
  (a) a gas inlet;
  (b) a different inlet for food product in said roof;
  (c) an aperture in said roof for receiving an upper extension of a support for container-sealing means; and
  (d) a bottom opening for receiving in said chamber at least a part of a container having an open end;
(3) a container support means;
(4) means to move said container support means between a lowered position at which a container can be received and discharged, a raised position at which the container can be closed by a closure and an intermediate position at which a container can be at least partially in said head;
(5) means mounted on said head to close said bottom opening when said container support means is at said intermediate position and above;
(6) means to introduce pressurized gas through said gas inlet into said filling head;
(7) means to selectively close and open said gas-introducing means;
(8) means to support said closure and having an upper extension extending through said aperture of said filling head and mounted on said support structure for movement about a vertical axis;
(9) means to provide simultaneous relative vertical movement between said closure support means and both said container support means and said means to close said bottom opening to force the closure onto the container;
(10) conduit means to introduce food product extending into said different inlet and having an opening at the bottom end of the extension from which product can be discharged downwardly toward the bottom opening of said head;
(11) means to selectively close and open said product conduit means; and
(12) means to communicate said filling head with the atmosphere.

10. The apparatus of claim 9 wherein said conduit means to introduce product is fixed to provide its opening at a fixed elevation, and further including means to provide simultaneous vertical movement of said container support means above said raised position and said means to close said bottom opening of said head closer to said fixed elevation for the filling operation.

11. The apparatus of claim 10 wherein the head is mounted for vertical movement and said simultaneous moving means raises said head with said container support means.

12. The apparatus of claim 11 wherein said closure support means is mounted for vertical movement and said apparatus further including means to urge upward said closure support means.

13. The apparatus of claim 12 wherein said means to move said container support means includes means to move it above said raised position to a position at which a container on said support means engages a closure on said closure support means.

14. Apparatus for packaging liquid-containing food product, which comprises:
(1) a support structure;
(2) a filling haed mounted on said support structure for relative vertical movement between said support structure and said filling head, said filling head having
  (a) a gas inlet in the roof of said head;
  (b) a different inlet in said roof for food product;
  (c) an aperture in said roof for receiving therethrough an upper extension of a support for container-sealing means; and
  (d) a bottom opening for receiving in said chamber at least an open upper end of a container;
(3) a container support means;
(4) means to provide relative movement between said container support and said filling head so that the container is moved between a container-receiving and -discharging position to a filling position in which at least the open end of the container in upstanding position is in said filling head with said open end of the container spaced from the roof of said filling head;
(5) means to close said opening of said filling head when the container is at the filling position;
(6) means to introduce pressurized gas through said gas inlet into said filling head;
(7) means to selectively close and open said gas-introducing means;
(8) means to support said container-sealing means and having an upper extension extending through said aperture of said filling head;
(9) means to provide simultaneous relative vertical movement between said support for said container-sealing means and said container support at its filling position and between said container-sealing means and said filling head to bring together the container at its filling position and said container-sealing means into a sealing position and then to separate the container and said container-sealing means;
(10) conduit means, to introduce food product, extending into said different inlet and having an opening to discharge food product downwardly toward said bottom opening of said filling head;
(11) conduit means concentric with said product introducing conduit means to define an annular conduit;
(12) means to introduce steam into said annular conduit;
(13) means to selectively close and open said product-introducing conduit means and said annular conduit with respect to said filling head; and
(14) means to open said filling head through said gas inlet to the atmosphere.

15. The apparatus of claim 14 wherein said product-introducing conduit means and said concentric conduit means are pipes terminating at different elevations that are higher and lower respectively and wherein said means to close and open said product-introducing conduit means and said gas inlet is a plate mounted on said support structure for lateral movement within said filling head to abut said concentric pipe to close said product-introducing means whereby steam in said annular conduit can maintain gaseous pressure against product in the central pipe.

16. The apparatus of claim 2 wherein said means to provide simultaneous relative vertical movement between said support for said container-sealing means and said container support means and between said container-sealing means and said filling head comprises:
(1) a pair of arms pivotally mounted at their upper end on said filling head and having an angular slot at their lower end, said slot having a generally vertical portion and a generally horizontal portion;
(2) pins mounted on said container support means and extending into said slots; and
(3) means to move said arms about said pivotal mounting in one direction so that said pins are in the distal end of said horizontal portion of said slots and to move said arms in the opposite direction so that said arms are at the junction of said horizontal and vertical portions of said slots, and
wherein each slot has the vertical portion extending downwardly from the horizontal portion.

17. A method of packaging a liquid-containing food product in a container, which comprises in sequence:
(1) supporting at an intermediate position a filling chamber having a bottom opening;
(2) supporting a closure at a first position in alignment with and at an elevation just below said opening;
(3) lowering said filling chamber until at a lower position at which said supported closure while still at said first position is now above said opening and entirely within said chamber;
(4) supporting a container having a top open end below and spaced from said opening of said lowered chamber;
(5) raising said supported container until a part of it can be abutted by said opening to close said lowered chamber;
(6) moving laterally said supported closure within said chamber now closed until out of alignment with said open end of said container;
(7) communicating a gas inlet of said container with a source of pressurized gas to provide an elevated gaseous pressure in said chamber;
(8) flowing said food product through a different inlet of said chamber into said container;
(9) ceasing said flow;
(10) moving said closure laterally to said first position within said chamber;
(11) raising in unison said chamber and said container to force said supported closure onto said container in hermetically sealing relationship while said chamber is at an upper position;
(12) closing communication between said gas inlet and said source of pressurized gas;
(13) releasing pressure in said chamber through an inlet of said chamber to the atmosphere;
(14) lowering said container and said chamber in unison until said chamber is at said intermediate position; and
(15) lowering said container only while supporting said chamber at said intermediate position.

18. The method of claim 17 wherein the lateral movement of said supported closure provided by step (6) is provided by movement about a vertical axis that extends through said chamber but is spaced from said closure.

19. The method of claim 18 and further including during step (5) the step of introducing into said chamber a purging gas downwardly toward the open end of said container but spaced from the longitudinal axis of said container to displace air from said container and with step (6) being initiated during said purging step.

20. The method of claim 19 wherein the purging gas is steam and the product is baby food formula.

21. A method of packing a liquid-containing food product in a container, which comprises in sequence:
(1) supporting at an intermediate position a filling chamber having a bottom opening;
(2) supporting a closure at a first position in alignment with and at an elevation just below said opening;
(3) lowering said filling chamber until at a lower position at which said supported closure while still at said first position is now above said opening and entirely within said chamber;
(4) supporting a container having a top open end below and spaced from said opening of said chamber;
(5) raising said supported container while introducing purging gas into said lowered chamber for displacing air from said container until said container abuts said bottom opening to close said lowered chamber;
(6) moving laterally said supported closure to a second position within said chamber until out of alignment with said open end of said container;
(7) communicating a gas inlet of said container with a source of pressurized gas to provide an elevated gaseous pressure in said chamber;
(8) raising in unison said chamber, said container and said closure to introduce into said container a filling tube extending through a different inlet of said chamber until the bottom open end of said filling tube is near the bottom inner surface of said container while said chamber is at an upper position;
(9) flowing said food product through said filling tube while simultaneously lowering said chamber, said container and said closure to gradually raise the bottom end of said filling tube as said food product is being introduced into said container;
(10) ceasing said flow of said food product;
(11) continuing lowering of said chamber, said container and said closure until the bottom end of said filling tube is substantially above the horizontal plane of lateral movement of said closure;
(12) moving said closure laterally to said first position within said chamber;
(13) raising in unison said chamber and said container to force said supported closure onto said container in hermetically sealing relationship;
(14) closing communication between said gas inlet and said source of pressurized gas;
(15) releasing pressure in said chamber through an inlet of said chamber to the atmosphere;
(16) lowering said container and said chamber in unison until said chamber is at said intermediate position; and
(17) lowering said container only, while supporting said chamber at said intermediate position.

22. The method of claim 21 wherein the purging gas and the gas used to provide the elevated gaseous pressure is steam and the product is baby food formula.

References Cited

UNITED STATES PATENTS

| | | | |
|---|---|---|---|
| 2,695,743 | 11/1954 | Wetherby-Williams | 53—112 |
| 2,874,523 | 2/1959 | Ryan | 53—22 |
| 2,931,150 | 4/1960 | Ryan | 54—112 |
| 2,972,214 | 2/1961 | Juin | 53—37 |

A. LOUIS MONACELL, *Primary Examiner.*

M. W. GREENSTEIN, *Assistant Examiner.*